US010002285B2

(12) United States Patent
John Archibald et al.

(10) Patent No.: US 10,002,285 B2
(45) Date of Patent: Jun. 19, 2018

(54) FAST, HIGH-ACCURACY, LARGE-SCALE FINGERPRINT VERIFICATION SYSTEM

(71) Applicant: Qualcomm Incorporated, San Diego, CA (US)

(72) Inventors: Fitzgerald John Archibald, Toronto (CA); John Keith Schneider, Williamsville, NY (US); Frederick Kiefer, Williamsville, NY (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 14/866,259

(22) Filed: Sep. 25, 2015

(65) Prior Publication Data

US 2017/0091526 A1    Mar. 30, 2017

(51) Int. Cl.
*G06K 9/00* (2006.01)

(52) U.S. Cl.
CPC ..... *G06K 9/00093* (2013.01); *G06K 9/00013* (2013.01); *G06K 9/00073* (2013.01)

(58) Field of Classification Search
CPC ........... G06K 9/00087; G06K 9/00067; G06K 9/00093; G06F 21/32
USPC .................................................. 382/125
See application file for complete search history.

(56) References Cited

U.S. PATENT DOCUMENTS

| 6,941,003 | B2 | 9/2005 | Ziesig | |
|---|---|---|---|---|
| 7,359,532 | B2* | 4/2008 | Acharya | G06K 9/00087 |
| | | | | 382/124 |
| 8,588,484 | B2 | 11/2013 | Wang et al. | |
| 2008/0273770 | A1* | 11/2008 | Kohout | G06K 9/00073 |
| | | | | 382/125 |
| 2010/0046810 | A1* | 2/2010 | Yamada | G06K 9/00026 |
| | | | | 382/124 |
| 2013/0216106 | A1* | 8/2013 | Hara | G06K 9/00067 |
| | | | | 382/115 |
| 2014/0331059 | A1* | 11/2014 | Rane | G06K 9/00093 |
| | | | | 713/186 |

(Continued)

OTHER PUBLICATIONS

Barnes et al., "The Fingerprint Sourcebook," National Institute of Justice, Jul. 2011, 422 pages.

(Continued)

*Primary Examiner* — Van D Huynh
(74) *Attorney, Agent, or Firm* — Weaver Austin Villeneuve & Sampson LLP-QUAL

(57) ABSTRACT

Apparatuses, systems, and techniques are disclosed for rapidly identifying potential candidates within a pool of enrolled fingerprint images for unconstrained fingerprint matching with an inquiry fingerprint. The techniques may include applying one or more window regions to both enrolled and inquiry fingerprint images and determining a minutiae score for each such window region based on the minutiae within that window region. One or more components of the minutiae score for window regions of the inquiry image may then be compared against similar components in the minutiae scores for window regions of the enrolled fingerprint images, and enrolled fingerprint images having window regions with minutiae scores sufficiently similar to the minutiae score of a window region of the inquiry fingerprint image may be selected for later unconstrained matching with the inquiry fingerprint image.

20 Claims, 11 Drawing Sheets

(56) References Cited

U.S. PATENT DOCUMENTS

2015/0294131 A1* 10/2015 Neskovic ........... G06K 9/00026
                                                                      382/125

OTHER PUBLICATIONS

Jea et al., "A minutia-based partial fingerprint recognition system," Pattern Recognition 38, 2005, 13 pages.
Singh et al., "Fingerprint Indexing using Minutiae and Pore Features," 2009, 6 pages.
International Search Report and Written Opinion—PCT/US2016/049100—ISA/EPO—dated Nov. 22, 2016.
International Preliminary Report on Patentability—PCT/US2016/049100—ISA/EPO—dated Dec. 13, 2017.

* cited by examiner

| Region | Ridge Endings | Bifurcations | Total |
|---|---|---|---|
| A | 6 | 7 | 13 |
| B | 7 | 4 | 11 |
| C | 15 | 2 | 17 |

O Bifurcation Minutia
◌ Ridge Ending Minutia

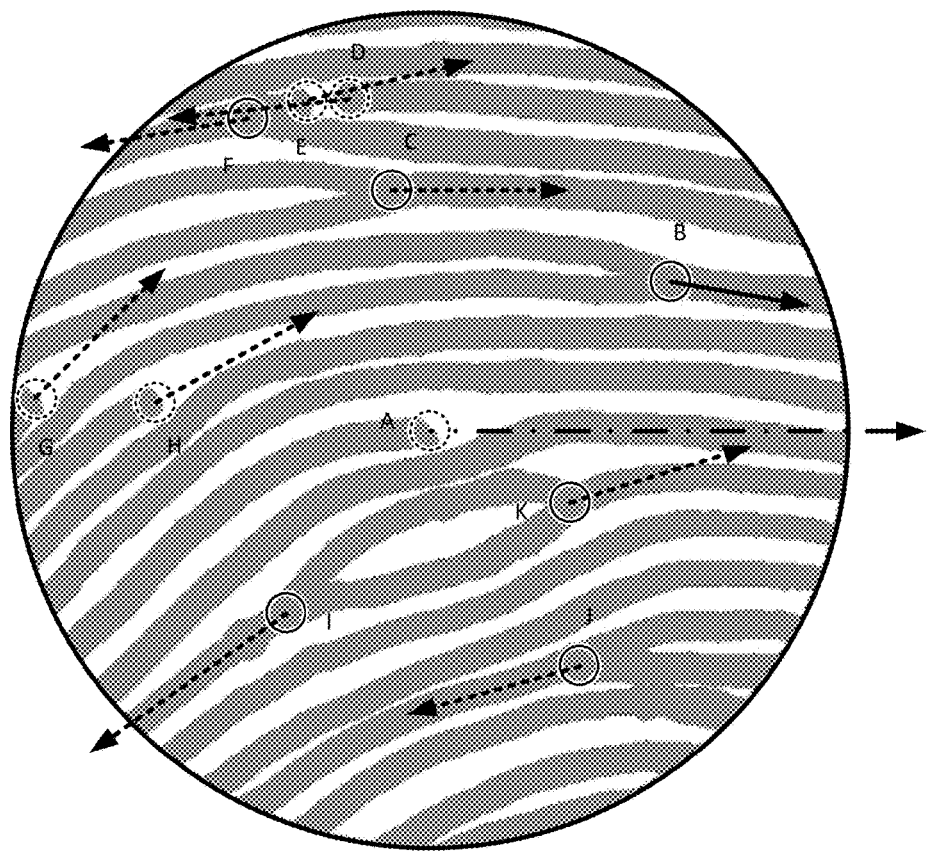
| Minutia | Angle |
|---------|-------|
| A | 0° |
| B | 10° |
| C | 0° |
| D | 13° |
| E | 174° |
| F | 170° |
| G | 45° |
| H | 29° |
| I | 145° |
| J | 165° |
| K | 17° |
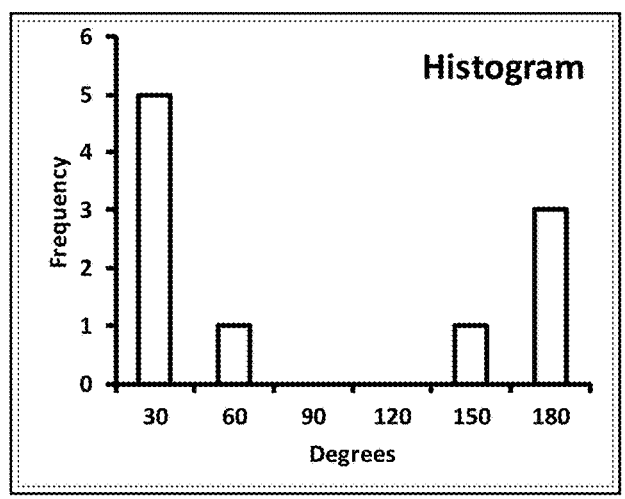
Figure 4

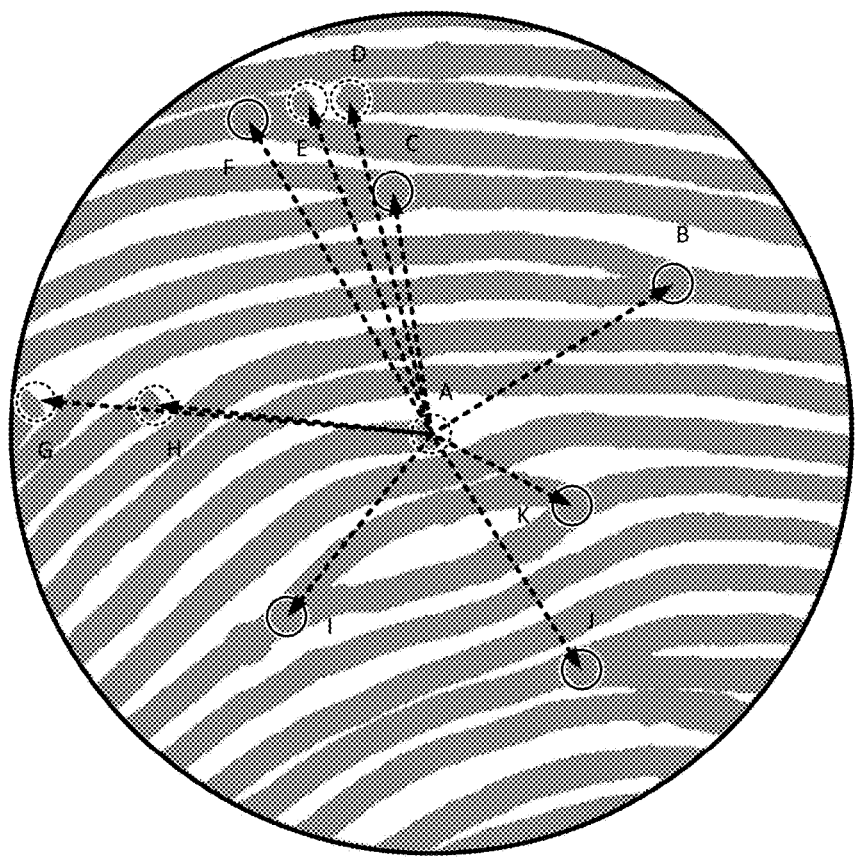
| Minutiae Pair | Distance |
|---|---|
| AB | 2.7 |
| AC | 2.4 |
| AD | 3.3 |
| AE | 3.3 |
| AF | 3.6 |
| AG | 3.9 |
| AH | 2.7 |
| AI | 2.4 |
| AJ | 2.7 |
| AK | 1.5 |
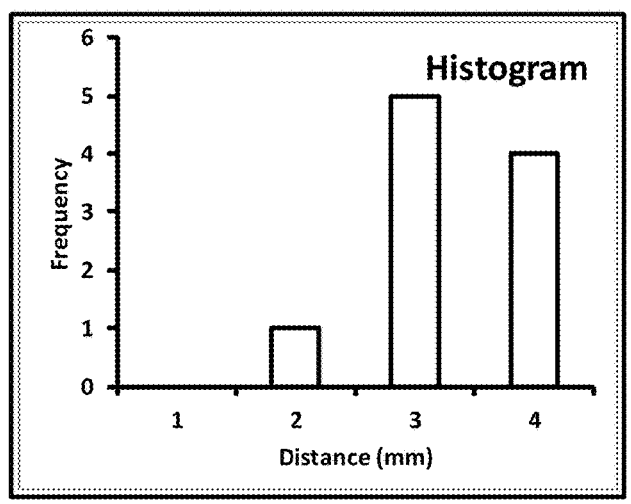
Figure 5

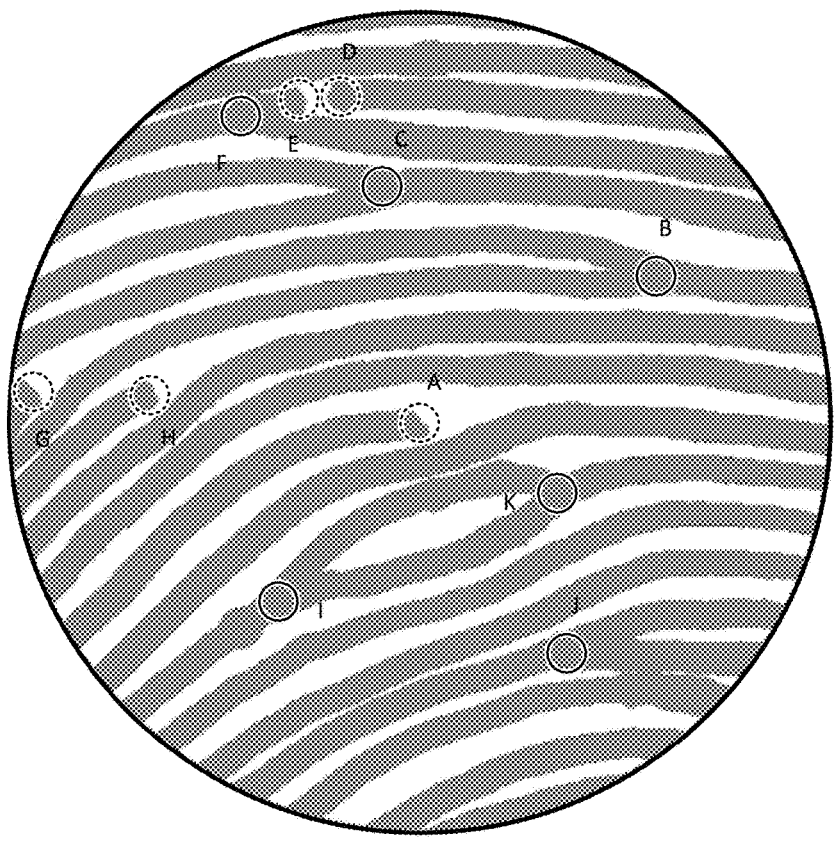
| Minutiae Type | Count | Density |
|---|---|---|
| Bifurcation | 6 | 1.18 |
| Ridge Ending | 5 | 0.98 |
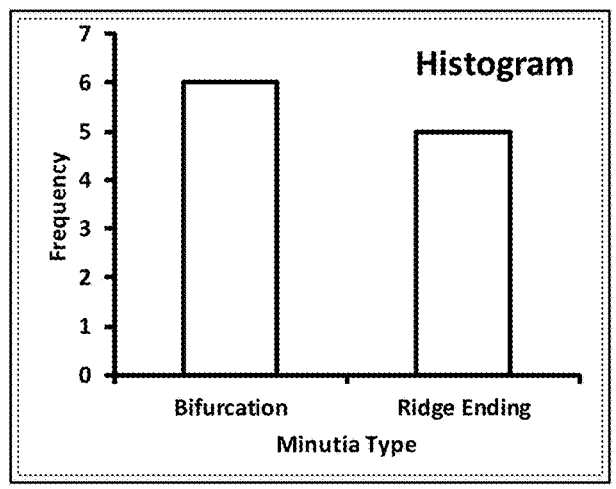
Figure 6

FAST, HIGH-ACCURACY, LARGE-SCALE FINGERPRINT VERIFICATION SYSTEM

TECHNICAL FIELD

This disclosure relates generally to the field of fingerprint identification, and, more specifically, to improved systems and techniques for identifying fingerprints using a large-scale fingerprint database.

DESCRIPTION OF THE RELATED TECHNOLOGY

Forensic fingerprint identification was first proposed in the late 1800's and has evolved considerably over time, especially with the advent of computers. However, even with the aid of modern computing systems, fingerprint identification is a time-consuming and expensive task.

In a typical fingerprint identification or authentication system, an "inquiry" fingerprint, e.g., a whole or partial fingerprint taken from a crime scene or a fingerprint obtained from a biometric scanner, is compared against a database of "enrolled" fingerprints that are housed in a fingerprint database. The enrolled fingerprints are typically of high quality and may have been obtained from individuals who have been arrested and subjected to fingerprinting as part of a police booking procedure, people who have sensitive positions and have been enrolled in a biometric authentication system, etc. However, the enrolled prints may also sometimes include prints of poor quality. For example, a fingerprint database may include partial prints taken from a crime scene of an unsolved murder—the identity of the murderer may not be known, but it may still be desirable to see if an inquiry fingerprint matches such an enrolled fingerprint in order to determine if the suspect of the unsolved murder is also involved in another crime in which fingerprints were left behind.

In order to determine if an inquiry fingerprint matches an enrolled fingerprint, various levels of detail in the two fingerprints are compared. Fingerprints are formed by the interaction of "friction ridges" on a person's finger; these friction ridges tend to flow in certain patterns that fall into several broad categories; these categories are referred to as level 1 detail. Level 2 detail includes information on individual friction ridge paths as well as "minutiae" associated with each friction ridge. Minutiae, which are thought of as "events" along the friction ridges, are points where some readily identifiable change in a friction ridge occurs, e.g., bifurcations (where a ridge splits into two ridges), ridge endings, dots, etc. Minutiae can be observed by the naked eye with little or no magnification. Finally, level 3 detail may include friction ridge width, friction ridge edge characteristics, and sweat pore locations. Level 3 details typically require magnification in order to be discernible by a human observer. For the purposes of this disclosure, individual level 2 and level 3 features may be referred to as "minutiae."

When a fingerprint is "enrolled" in a fingerprint identification system, the enrolled fingerprint is typically classified based on its level 1 details. There are typically a very limited number of level 1 categorizations, e.g., "archs," "loops," "whorls," etc. There may also be sub-classifications within these categorizations, e.g., "left-slant loops," "right-slant loops," etc. While the number of discrete categorizations may vary depending on the classification system used, the number of different categorizations based on level 1 detail typically ranges from single digits to low double-digits—for example, the Automated Fingerprint Identification System (AFIS) used by the Federal Bureau of Investigation classifies fingerprints into one of eight different pattern types based on the level 1 detail: arch, left-slant loop, right-slant loop, whorl, amputation, and complete scar (two other categories are included for prints that defy classification and for prints that are of too low a quality to be useful fingerprints).

When an inquiry fingerprint is obtained, it is also categorized based on its level 1 detail. After the inquiry fingerprint is categorized in such a manner, the enrolled fingerprints may be filtered to only include enrolled fingerprints with categories compatible with the classification of the inquiry fingerprint. For example, if an inquiry fingerprint is categorized as a "whorl," then there would be no need to compare the inquiry fingerprint to enrolled fingerprints having a "loop" or "arch" categorization, since such enrolled fingerprints would not match based on their level 1 detail. However, enrolled fingerprints that were not classifiable may still be considered when looking for a match for the inquiry fingerprint, as such enrolled fingerprints may be partial prints that do not contain enough information to classify them based on their level 1 detail, but may have enough detail to be matched against the inquiry fingerprint based on their level 2 detail.

FIG. 1 depicts an example fingerprint. Fingerprint 100 has ridges 102 that include minutiae such as bifurcations 102, ridge endings 104, and a core 108. It is to be understood that not all such features may be individually called out in FIG. 1; only some representative such features are specifically indicated.

After the enrolled fingerprints in such conventional systems are filtered based on their level 1 detail, each enrolled fingerprint remaining after the filtering may be compared against the inquiry fingerprint to determine how closely the individual minutiae of each inquiry fingerprint/enrolled fingerprint pair match. In modern fingerprinting systems, this procedure is automated, although a human fingerprint examiner may still review the "matched" results to determine if the match is correct.

Thus, the basic paradigm for modern fingerprint matching is that of a two-phase process. In the first phase, an inquiry print is categorized based on its level 1 detail and the enrolled fingerprints having categorizations incompatible with the categorization of the inquiry fingerprint are then filtered out. In the second phase, the minutiae of the enrolled fingerprints remaining after the filtering is performed are compared against the minutiae of the inquiry fingerprint to determine, for example, the degree to which the locations and types of the minutiae in the two fingerprint images match. The matching portion of the process is extremely computationally-intensive as it typically involves re-analyzing the filtered enrolled fingerprints against each new inquiry fingerprint, whereas in the categorization and filtering portion of the process, the more computationally intensive categorization portion of the process need often only be done once for the enrolled fingerprints.

SUMMARY

The systems, methods and devices of this disclosure each have several innovative aspects, no single one of which is solely responsible for the desirable attributes disclosed herein. Included among these aspects are at least the following implementations, although further implementations may be set forth in the detailed description or may be evident from the discussion provided herein.

In some implementations, a method may be provided that includes (a) determining, for each enrolled fingerprint of a plurality of enrolled fingerprints stored in a fingerprint database, locations for one or more window regions within that enrolled fingerprint; (b) determining, for each window region of each enrolled fingerprint, a minutiae score that is a function of one or more characteristics exhibited by minutiae contained within that window region; and (c) determining, for an inquiry fingerprint, locations for one or more window regions within the inquiry fingerprint. The method may further include (d) determining, for each window region of the inquiry fingerprint, the minutiae score based on the characteristics exhibited by the minutiae contained within that window region; (e) comparing at least one component of at least one of the one or more minutiae scores determined for the one or more window regions of the inquiry image against at least one component of the minutiae scores determined for a set of the one or more window regions of the enrolled fingerprints; and (f) determining that a set of the enrolled fingerprints with window regions in the set of window regions have at least one window region that is associated with a minutiae score that has at least one component that is within a predetermined range of at least one corresponding component of the minutiae score of at least one of the window regions of the inquiry fingerprint. In such implementations, the method may also include performing unconstrained matching between the inquiry fingerprint and the enrolled fingerprints in the set of enrolled fingerprints. In such implementations, the window regions for the enrolled fingerprints and the inquiry fingerprint may all be substantially the same size and shape.

In some further implementations, the method may further include, prior to performing (e), determining that the minutiae score for one or more of the one or more window regions of the enrolled fingerprints does not meet a threshold requirement and populating the first set of window regions with the window regions of the enrolled fingerprints that have a minutiae score that meets the threshold requirement.

In some implementations of the method, the window regions may each be substantially circular. In some other implementations of the method, the window regions may each be substantially rectangular.

In some such implementations, the minutiae score may be a function of one or more characteristics such as the type or types of minutiae within the window region, number of minutiae within the window region, number of each type of minutiae within the window region, angular distribution between minutiae within the window region, distance distribution between minutiae within the window region, ridge density within the window region, ridge count within the window region, and/or type of minutia closest to center of the window region.

In some implementations of the method, the window regions for each enrolled fingerprint or inquiry fingerprint may each be centered on a different minutia of that enrolled fingerprint or inquiry fingerprint.

In some implementations, a non-transitory, tangible machine-readable storage medium may be provided that stores machine-readable instructions for controlling one or more processors to: (a) determine, for each enrolled fingerprint of a plurality of enrolled fingerprints stored in a fingerprint database, locations for one or more window regions within that enrolled fingerprint; (b) determine, for each window region of each enrolled fingerprint, a minutiae score that is a function of one or more characteristics exhibited by minutiae contained within that window region; and (c) determine, for an inquiry fingerprint, locations for one or more window regions within the inquiry fingerprint. The storage medium may further store instructions for controlling the one or more processors to also: (d) determine, for each window region of the inquiry fingerprint, the minutiae score based on the characteristics exhibited by the minutiae contained within that window region; (e) compare at least one component of at least one of the one or more minutiae scores determined for the one or more window regions of the inquiry image against at least one component of the minutiae scores determined for a set of the one or more window regions of the enrolled fingerprints; and (f) determine that a set of the enrolled fingerprints with window regions in the set of window regions have at least one window region that is associated with a minutiae score that has at least one component that is within a predetermined range of at least one corresponding component of the minutiae score of at least one of the window regions of the inquiry fingerprint. The storage medium may also store instructions for controlling the one or more processors to perform unconstrained matching between the inquiry fingerprint and the enrolled fingerprints in the set of enrolled fingerprints. In such an implementation, the window regions for the enrolled fingerprints and the inquiry fingerprint may all be substantially the same size and shape.

In some such implementations, the storage medium may also store instructions for controlling the one or more processors to, prior to performing (e), determine that the minutiae score for one or more of the one or more window regions of the enrolled fingerprints does not meet a threshold requirement and populate the first set of window regions with the window regions of the enrolled fingerprints that have a minutiae score that meets the threshold requirement.

In some implementations of the storage medium, the storage medium may also store instructions for controlling the one or more processors to cause the window regions to be substantially circular. In some other implementations of the storage medium, the storage medium may also store instructions for controlling the one or more processors to cause the window regions to be substantially rectangular.

In some implementations of the storage medium, the storage medium may also store instructions for controlling the one or more processors to determine the minutiae score as a function of one or more characteristics such as the type or types of minutiae within the window region, number of minutiae within the window region, number of each type of minutiae within the window region, angular distribution between minutiae within the window region, distance distribution between minutiae within the window region, ridge density within the window region, ridge count within the window region, and/or type of minutia closest to center of the window region.

In some implementations of the storage medium, the storage medium may also store instructions for controlling the one or more processors to cause the window regions for each enrolled fingerprint or inquiry fingerprint to each be centered on a different minutia of that enrolled fingerprint or inquiry fingerprint.

In some implementations, a system may be provided. The system may include, for example, a memory, one or more processors, an enrolled fingerprint database, and an inquiry fingerprint source. The memory and the one or more processors may be communicatively connected with one another and with the enrolled fingerprint database and the inquiry fingerprint source, and the memory may store machine-readable instructions for controlling the one or more processors to: (a) determine, for each enrolled fingerprint of a plurality of enrolled fingerprints stored in the fingerprint database, locations for one or more window regions within that enrolled fingerprint, (b) determine, for each window region of each enrolled fingerprint, a minutiae score that is a function of one or more characteristics exhibited by minutiae contained within that window region, and (c) determine, for an inquiry fingerprint obtained from the inquiry fingerprint source, locations for one or more window regions within the inquiry fingerprint. The memory may also store further machine-readable instructions for controlling the one or more processors to (d) determine, for each window region of the inquiry fingerprint, the minutiae score based on the characteristics exhibited by the minutiae contained within that window region, (e) compare at least one component of at least one of the one or more minutiae scores determined for the one or more window regions of the inquiry image against at least one component of the minutiae scores determined for a set of the one or more window regions of the enrolled fingerprints, and (f) determine that a set of the enrolled fingerprints with window regions in the set of window regions have at least one window region that is associated with a minutiae score that has at least one component that is within a predetermined range of at least one corresponding component of the minutiae score of at least one of the window regions of the inquiry fingerprint. The memory may also store machine-readable instructions for controlling the one or more processors to perform unconstrained matching between the inquiry fingerprint and the enrolled fingerprints in the set of enrolled fingerprints. In such implementations, the window regions for the enrolled fingerprints and the inquiry fingerprint may all be substantially the same size and shape.

In some implementations of the system, the memory also may store further machine-readable instructions for controlling the one or more processors to, prior to performing (e), determine that the minutiae score for one or more of the one or more window regions of the enrolled fingerprints does not meet a threshold requirement and populate the first set of window regions with the window regions of the enrolled fingerprints that have a minutiae score that meets the threshold requirement.

In some implementations of the system, the memory also may store further machine-readable instructions for controlling the one or more processors to cause the window regions to be substantially circular. In some other implementations of the system, the memory also may store further machine-readable instructions for controlling the one or more processors to cause the window regions to be substantially rectangular.

In some implementations of the system, the memory also may store further machine-readable instructions for controlling the one or more processors to determine the minutiae score as a function of one or more characteristics such as the type or types of minutiae within the window region, number of minutiae within the window region, number of each type of minutiae within the window region, angular distribution between minutiae within the window region, distance distribution between minutiae within the window region, ridge density within the window region, ridge count within the window region, and/or type of minutia closest to center of the window region.

In some implementations of the system, the memory also may store further machine-readable instructions for controlling the one or more processors to cause the window regions for each enrolled fingerprint or inquiry fingerprint to each be centered on a different minutia of that enrolled fingerprint or inquiry fingerprint.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 4 depicts an example window region and a portion of an example fingerprint contained within it; angular orientations of two types of minutiae are shown.

FIG. 5 depicts the example window region of FIG. 4; distances between the center point/minutia and the other minutiae within the window region are shown.

FIG. 6 depicts the example window region of FIG. 4 with two different minutiae types highlighted.

Figure 1:
FIG. 1 depicts an example of a fingerprint.

Like reference numbers and designations in the various drawings indicate like elements. Additionally, a convention has been adopted herein where components that are similar between different drawings are referred to using the same last two digits of their corresponding reference numbers. In such situations, unless indicated otherwise, it may be assumed that description of one such component or element with respect to one Figure may also be applied to similar components or elements depicted in other Figures, as indicated by the common last two digits of the reference numbers associated with such components.

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. Thus, the teachings are not intended to be limited to the implementations depicted solely in the Figures, but instead have wide applicability as will be readily apparent to one having ordinary skill in the art.

The techniques and systems discussed herein provide for a rapid and high-accuracy fingerprint identification system. In such systems and techniques, enrolled and inquiry fingerprint images may be assessed to determine various types of constrained matching characteristics that are extracted from the level 2 and/or level 3 detail of the fingerprint. For enrolled fingerprint images, such assessment may be performed on enrollment or at some other point prior to attempting to perform a fingerprint match. For inquiry fingerprints, such assessment may be performed at the time the inquiry fingerprint is entered into the system for matching purposes. Each such assessment may be performed in isolation, and the results of each assessment may be dependent only on the data contained within the fingerprint image with which the assessment is associated. Constrained matching may be viewed as a type of fingerprint classification. The term "constrained" is used herein, as will be seen, since the matching is constrained to data associated with one or more "window regions" that are sub-portions of the fingerprint images, as opposed to the entire fingerprint image. In contrast, the term "unconstrained matching" is used herein to refer to matching comparisons between two fingerprints that are not constrained to sub-portions of the fingerprint images. Unconstrained matching is what is typically thought of as "fingerprint matching," and may be visualized, for example, if one thinks of taking same-scale images of two fingerprints, overlaying them with each other, rotating and aligning them to see how many minutiae between the two fingerprints are "common." Unconstrained matching is computationally intensive.

In the techniques and systems disclosed herein, constrained matching is used as a way to reduce the number of enrolled fingerprint images that will be subjected to unconstrained matching with respect to a particular inquiry fingerprint image. By reducing the number of enrolled fingerprints that are to be subjected to unconstrained matching, the unconstrained matching process is made much more computationally efficient and much faster.

The term "fingerprint image" or "fingerprint" is used herein to refer to digital raster images of fingerprints, as well as to any other representations of fingerprints, including vector format representations of fingerprints and other, more abstract forms of fingerprint representations, including, for example, simple lists of the locations, types, orientations, etc. of various fingerprint minutiae for each fingerprint.

Figure 2:
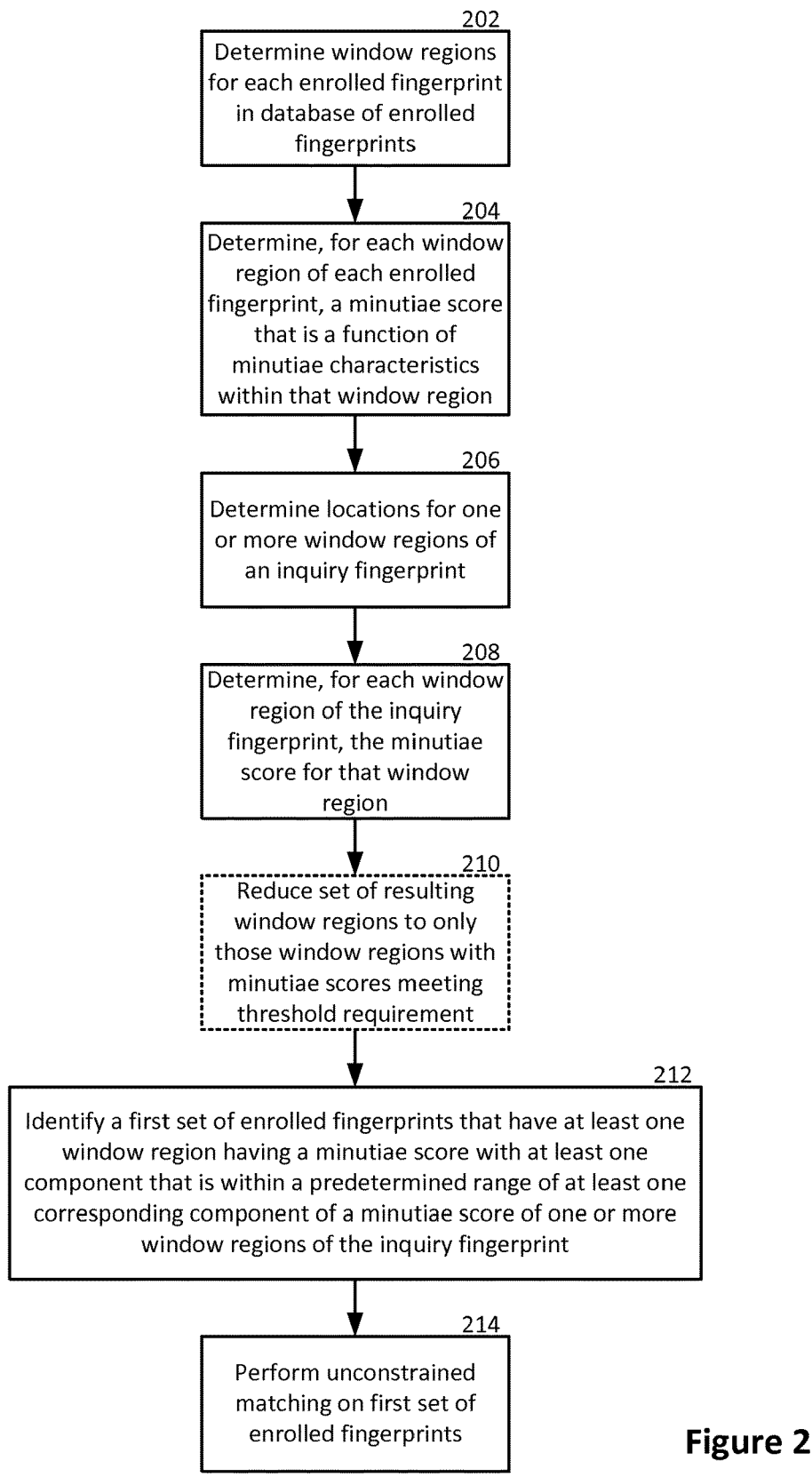
FIG. 2 depicts a flow chart of an example constrained matching technique.

FIG. 2 depicts a flow chart of an example constrained matching technique. In the technique, one or more window regions may be defined for each fingerprint image in an enrolled fingerprint database in block 202. The window regions used may be of any shape, although certain shapes may be more well-suited than others in certain contexts. For example, in forensic fingerprint matching contexts where the orientation of an inquiry fingerprint is potentially indeterminate, e.g., a latent partial print may be located at a crime scene but it may not be possible to determine how that partial print should be oriented relative to the finger that produced it, the window regions may be defined to be circular such that the orientation of each window region with respect to the inquiry fingerprint does not affect the contents of that window region. Non-circular window regions, in contrast, may be suitable for fingerprint identification contexts in which there is little uncertainty regarding the orientation of each fingerprint relative to some global reference frame, e.g., relative to the finger that produced it. For example, in many access-control devices that use fingerprint identification, the access-control device may have a fingerprint scanner that limits the angle at which the scanned finger can be relative to the fingerprint scanner, thus encouraging consistent angular orientation of the fingerprints that are obtained. In such an example device, the window region may be circular or may, alternatively, be another shape that is potentially sensitive to angular orientation, such as a rectangular window. Using a rectangular window may be somewhat less computationally expensive, as fingerprint image data is typically already defined according to a rectilinear coordinate system. In some implementations, each enrolled fingerprint image and inquiry fingerprint image may be normalized with respect to angular rotation prior to applying the window regions such that the orientation of each fingerprint image is the same. For example, if each fingerprint image includes a "core" feature (nearly all fingerprints have either one or two core features near the center of the fingerprint, although partial fingerprints may not include this region of the fingerprint), then the angular orientation of the core feature may be used as a reference, e.g., the fingerprint image may be rotated until the core feature is oriented at zero degrees relative to the image coordinate system X-axis. If a fingerprint image has two core features, then some other normalization standard may be used—in some implementations, such a fingerprint image may simply be duplicated; one copy would be normalized according to one core feature, and the other copy according to the other core feature.

Figure 3:
FIG. 3 depicts the example fingerprint of FIG. 1, but with three equal-sized circular window regions A, B, and C indicated.

FIG. 3 depicts the example fingerprint of FIG. 1, but with three equal-sized circular window regions A, B, and C indicated. Ridge ending and bifurcation minutiae within each circular window region are circled with dotted and solid lines, respectively. The table in FIG. 1 summarizes the minutiae characteristics of each of the three window regions. While the example in FIG. 3 has non-overlapping window regions, window regions may overlap within a fingerprint image.

The window regions used in the constrained matching process are all substantially the same size and shape for all of the enrolled fingerprint images and the inquiry fingerprint image, e.g., a plurality of 5 mm diameter circular regions may be defined for each enrolled fingerprint image as well as for the inquiry fingerprint image. It is to be understood that, as used herein with respect to the window regions, the phrase "substantially the same size and shape" refers to window regions that are, from a statistical perspective, sufficiently similar in size and shape that there will, on average, be no more than 50% variance in the number of minutiae located within the window region for a given fingerprint image regardless of which of the specific window region is used. For example, a circular window region of 5 mm diameter might be used for some fingerprint images, and a circular window region of 5.1 mm diameter might be used for other fingerprint images—such window regions may still be viewed as being "substantially the same size and shape" if they meet the above requirements. In another example, a circular window region of 5 mm diameter might be used for some fingerprint images, and a polygon such as an icosagon (20-sided polygon) with a maximum dimension of 5 mm might be used for other fingerprint images—such window regions also may still be viewed as being "substantially the same size and shape" if they meet the above requirements.

It is to be further understood that multiple sets of differently-sized window regions may be evaluated with respect to the fingerprint images, although the window regions used in any particular categorization/filtering operation will be substantially the same size and shape. For example, if enrolled fingerprints in a database have been previously processed using 5 mm circular window regions and that same 5 mm circular window region cannot be located within the inquiry fingerprint image at various desired locations without a portion of the window region extending beyond the bounds of the inquiry fingerprint, it may be desirable to utilize a smaller window region, e.g., a 4 mm diameter circular window region, such that the entire window region overlaps with the inquiry fingerprint at those desired locations. In such a case, the enrolled fingerprints may be reprocessed using the 4 mm diameter circular window region and the 4 mm diameter circular window region may then also be used with the inquiry fingerprint image. In some implementations, the database of enrolled fingerprints may be pre-processed according to a spectrum of differently-sized and/or differently-shaped window regions to accommodate situations where an inquiry fingerprint image may only be large enough to support the use of a subset of those window regions; data regarding each such evaluation may then be stored for future reference.

The number and location of window regions applied to each enrolled fingerprint image or inquiry fingerprint image may be determined through a variety of different techniques—the primary difference between these techniques is processing overhead. In some implementations, window regions may be centered on every pixel (or at other regular X-Y spacings) in a fingerprint image. In other implementations, a more restrained approach may be practiced and the window regions may be centered on each individual minutia in a fingerprint. This may reduce the total number of window regions that will need to be analyzed for a given fingerprint image, which may reduce computation time. Window regions may typically be located such that the entire window region, or at least 80% of the window region, overlaps with the fingerprint image.

After each window region of a fingerprint image has been established in block 202, a minutiae score may be determined for that window region based on the characteristics of the minutiae within that window region in block 204. The minutiae score serves as a form of quantitative evaluation of the minutiae within the window region, and may be any function of one or more characteristics of the minutiae within the window region. Such minutiae characteristics may include, for example, the type or types of minutiae within the window region, the number of minutiae within the window region, the number of core minutiae within the window region, the number of delta minutiae within the window region, the number of each type of minutiae within the window region, the angular distribution between minutiae within the window region, the distance distribution between minutiae within the window region, the ridge density within the window region, the ridge count within the window region, and type of minutia closest to center of the window region. It is to be understood that while "ridges" may form the basis for a minutia characteristic, such as ridge count or ridge density, and may thus be viewed as "minutiae" in some sense, ridges are generally not considered to be minutiae for the purposes of determining other types of minutiae characteristics, such as overall minutiae density or type-density, overall minutiae count or type-count, inter-minutiae distance distribution, or angular distribution between minutiae (although aspects of the ridges near minutiae may, as discussed elsewhere in this paper, be used to determine the angular orientation of those minutiae). This is because minutiae are typically features that lend themselves to a "point" location, whereas ridges typically extend along a two-dimensional path and are thus not "point" locations— the exceptions, i.e., ridge count and/or ridge density, involve instances where ridges cross a reference axis, thus defining a series of feature points that may be used to determine ridge count or ridge density in a particular direction.

For example, a minutiae score may be based on the number of minutiae that are within the window region (which may also be expressed as a form of minutiae density if one takes the number of minutiae within the window region and divides that quantity by the area of the window region). Such a minutiae score is a single-dimensional or single-component minutiae score. In another example, the number of each type of minutiae (or the density of each type of minutiae) within a window region may be used to determine a minutiae type distribution within the window region, e.g., X bifurcations, Y ridge ends, and Z dots/islands. Such a minutiae score is a multi-dimensional or multi-component score. In yet another example, a minutiae score may involve multiple different types of minutiae characteristics and may provide multi-dimensional or multi-component output, e.g., the minutiae score may include multiple components that are each respectively based on a different one of the number of core minutiae within the window region, the number of delta minutiae within the window region, the number of bifurcation minutiae within the window region, the number of ridge ending minutiae within the window region, the angular distribution of minutiae within the window region, and the distance distribution between the minutiae within the window region and the center of the region.

In other examples, a number of minutiae characteristics of minutiae within a window region may be used to determine a minutiae score with a lower number of components, e.g., two or more minutiae characteristics may be used to determine a single-dimensional minutiae score or a single component of a multi-dimensional minutiae score.

In known unconstrained matching techniques, the minutiae of two fingerprints are identified and then compared to see if their individual locations and types match to a high enough degree that the two fingerprints may be considered a "match"—any known or future-developed fingerprint matching algorithm may be used for the unconstrained matching that is performed after the constrained matching discussed herein. Similarly, any desired algorithm for analyzing a fingerprint image and extracting information about the minutiae in the fingerprint image may be used to provide the characteristics that are then used to produce the minutiae score discussed herein. Such minutiae-extraction algorithms will typically identify all of the minutiae that are discernible in a fingerprint image and typically provide information regarding their X-Y coordinates (relative to some common frame of reference), their orientation (typically evaluated with respect to the orientation of the ridge that defines the minutia, if applicable, at the point where the minutia occurs), and their type, e.g., "bifurcation," "crossing," "ridge ending," "island," etc. Any desired minutiae extraction algorithm may be used, and, as with the fingerprint matching algorithm discussed above, the details of such a minutiae extraction algorithm are not discussed herein. Such minutiae-extraction algorithms are readily available and known to persons of ordinary skill in the art of fingerprint identification systems.

Such techniques include techniques for identifying locations of minutiae, identifying the type of minutiae, and extracting information regarding the minutiae, such as the "orientation" of the minutiae. Since minutiae are "point" features, e.g., a point where a ridge ends, a point where a ridge bifurcates, a point where an island exists, a point where a core or delta exists, the orientation of some minutiae may be established based on features immediately adjacent to the minutiae since a point does not, by itself, define an orientation. For example, the orientation of a ridge ending minutia may be defined as being the orientation of a vector that is tangent to the ridge centerline at the point where the ridge ending occurs. Similarly, the orientation of a bifurcation minutia may be defined as the orientation of a vector that is tangent to the ridge immediately prior to bifurcation. Any system may be used to determine orientations of minutiae, but the orientation determinations must, of course, be consistently applied to all of the fingerprints being processed to allow for meaningful comparisons between fingerprints.

For clarity, various examples of minutiae characteristics, and of minutiae scores based on such characteristics, are discussed below for a given example window region.

FIG. 4 depicts an example window region and a portion of an example fingerprint contained within it; angular orientations of two types of minutiae are shown. As can be seen, a number of minutiae have been identified within the circular window region. For simplicity, these minutiae have been classified as either bifurcations (solid circles) or ridge endings (dotted circles). In other implementations, additional minutiae types may be included or considered. For each minutia, the orientation of the minutia has been indicated using an arrow. In order for the angular orientations of minutiae within two window regions to be a meaningful basis for comparison between the two regions, they must generally share a common frame of reference. For scenarios in which the angular orientation of all of the fingerprints is known, e.g., such as may be the case for access control devices that limit the angular orientation of the subjects' fingers, and thus the fingerprints of those fingers, relative to the fingerprint reader, a global reference frame may be used to establish each angular orientation. For example, the center axis of the finger may be assumed to run vertically down the middle of the fingerprint image, and all angular orientations of the minutiae may be evaluated with respect to such a reference axis. In implementations where the angular orientation of the fingerprint images may not be able to be tied to a known reference axis, the angular orientations of the minutiae may be determined relative to a reference axis that is derivable directly from the features within the window region. For example, and as shown in FIG. 4, if the window region is centered on a particular minutia, the orientation of that minutia may be treated as the reference axis, and the angular orientations of the other minutiae in the window region may be evaluated with respect to the this reference axis. The angular orientations may be evaluated based on a either a full 360° angular range extending in one circumferential direction, or based on two 180° angular ranges extending in opposing circumferential directions, from the reference axis. The latter approach may be insensitive to mirror images of fingerprints, e.g., such as may occur if a fingerprint image accidentally becomes reversed. In the depicted example, the angular orientation of minutia "A" happens to be horizontal relative to the Figure orientation, and the angular orientations of the other minutiae are evaluated with respect to this horizontal orientation in terms of the absolute value of angular orientation of the minutiae in the window of +180°/−180°. As can be seen in the depicted table, the angular orientations of the minutiae relative to the angular orientation of the center minutia "A" form a particular distribution (this distribution does not include the angular orientation of minutia "A" since it is the reference orientation). The depicted histogram showing the distribution of these angular orientations within the window region is representative of one type of minutiae metric that could be used with a given window region—of course, histograms/distributions using binning other than 0° to <30°/30° to <60°/60° to <90°/90° to <120°/120° to <150°/150° to <180° may be used as well. In this case, the minutiae score may be a six-component score (one component per bin), although other binning may result in more or fewer components in the minutiae score; the minutiae score may also include additional components beyond the angular orientation components discussed.

FIG. 5 depicts the example window region of FIG. 4; distances between the center point/minutia and the other minutiae within the window region are shown. As discussed earlier, the distance distribution between the minutiae in a window region may also be used in determining a minutiae score or a component of a minutia score. Such a distribution may be evaluated with respect to any common reference point—such a reference point may be arbitrarily chosen for the window region (although it should be consistent between window regions; if it is not centered in the window region, care must be taken to ensure that the angular orientation of the window region with respect to the fingerprint image is taken into account. In the current example, the reference point used is the location of minutia "A," which is located at the center of the window region. The distance between each other minutia in the window region and minutia "A" may then be determined; example such distances (in mm) are listed in the accompanying table. The depicted histogram shows the distribution of these distances according to four separate bins (0 mm to <1 mm/1 mm to <2 mm/2 mm to <3 mm/3 mm to <4 mm). In this example, the minutiae score may be a four-component score; the minutiae score may also include additional components beyond the distance distribution components discussed.

FIG. 6 depicts the example window region of FIG. 4 with two different minutiae types highlighted. In this example, two types of minutiae are identified and the number of each type within the window region may be evaluated. In this example, there are 6 bifurcation minutiae and 5 ridge ending minutiae. A related characteristic may be the density of each type of minutiae, e.g., the number of each type of minutiae within the window region divided by the window region area. In this example, the window region is an 8 mm diameter circle. The minutiae count for each type of minutia, as well as the density per square millimeter for each type of minutia, for the window region are summarized in the depicted table and the histogram. Again, such a histogram may serve as another example of a minutiae score or as components of a minutiae score. It is also to be understood that such minutiae counts/densities may also be calculated with respect to groupings of multiple different types of minutiae, e.g., a count of the ridge endings within a window region may form one grouping (even though it has only one type of minutia in it) and a count of all other types of minutiae within the window region may form a second grouping). It is to be further understood that a global minutiae count or minutiae density, irrespective of the type of minutiae, may also be performed for a given window region and used as another form of minutiae score.

Figure 7:
FIG. 7 depicts the example window region of FIG. 4; a ridge count across the width of the window region is shown.

FIG. 7 depicts the example window region of FIG. 4; a ridge count across the width of the window region is shown. As noted earlier, another useful minutiae characteristic that may be used in a minutiae score determination is the ridge count or ridge density within a given window region. Due to bifurcations and other features including ridges that may not extend across the entire window region, this characteristic may be affected by the direction in along which the ridges are counted. One approach, which is depicted in FIG. 7, is to evaluate the ridge count along an axis perpendicular to the orientation of the minutia at the center of the window region. In other implementations, the ridge count may be evaluated along axes at multiple angular orientations and the highest ridge count observed may be utilized. In the depicted example, there are 18 ridges along the axis selected, which results in a 2.25 ridge/mm density.

The above examples are merely illustrative of some of the types of minutiae scores or components of minutiae scores that may be used in the techniques and apparatus disclosed herein. It is to be understood that a minutiae score may include combinations of two or more such example minutiae scores, e.g., a 10-component minutiae score including both angular orientation and distance distribution information. It is also to be understood that other such "demographic" characteristics of the minutiae within the window regions may be used to calculate minutiae scores or components thereof, and that such other demographic characteristics of the minutiae within the window regions are considered to be within the scope of this disclosure.

When an inquiry fingerprint image is received, the inquiry fingerprint image may be processed to determine the locations for one or more window regions in block 206, and subjected to the same window region analysis in block 208 that is performed on the enrolled fingerprint images, i.e., a minutiae score for each window region of the inquiry image may be determined. The determination of window regions for the inquiry image may proceed in a manner similar to that implemented with respect to the window regions for the enrolled fingerprint images.

Once the minutiae score for a window region from either an enrolled fingerprint image or an inquiry fingerprint image is determined, it may optionally be compared in block 210 against a threshold metric to determine if the minutiae score of the window region has practical value in terms of serving as a mechanism for filtering fingerprint images. For example, if 98% of the enrolled fingerprint images in a fingerprint database have a window region having a minutiae score of X, then filtering the enrolled fingerprint images to find enrolled fingerprints having at least one window region having the minutiae score of X will only filter out 2% of the enrolled fingerprints, which is not a significant reduction in the number of potential candidate fingerprints. In such a scenario, it may be desirable to filter out the window regions with minutiae scores that are less than some threshold amount, which would leave a set of only those window regions having minutiae scores greater than or equal to that threshold amount. It is to be understood that, in some implementations, window regions may also or alternatively be filtered so as to include in the set of window regions the window regions that have minutiae scores that are less than or equal to a threshold amount (if used in conjunction with the earlier-discussed threshold, this additional threshold will be a lower value than the earlier-discussed threshold). For example, it may actually be very rare to have any window regions with a low minutiae score for a fingerprint image, so a low minutiae score for a window region may also indicate that the window region may have value for differentiating the fingerprint image of the window region from other fingerprint images.

It is to be understood that in implementations involving multi-component minutiae scores, the evaluation of which window regions to include in the set of window regions may involve a more complex evaluation than in the single-dimensional case. For example, a minutiae score for a given window region may include four components, each relating to a different one of the number of cores, the number of deltas, the number of bifurcations, and the number of ridge endings. Each of these components may be associated with a different threshold or threshold range specific to that component. When the multi-component minutiae score of the window region is evaluated to determine if the window region should be included in the set of window regions, such an evaluation may be strict, e.g., every one of the components must satisfy the threshold requirement set forth for that respective component, or may be more permissive, e.g., only a proper subset of the minutiae score components needs to satisfy the threshold requirement set forth for those respective components.

Once minutiae scores for window regions from both the enrolled fingerprint images and the inquiry fingerprint images have been obtained, the minutiae scores of the window regions of interest from the inquiry fingerprint image may be compared against the minutiae scores of the set of window regions composed of window regions from the enrolled fingerprint images in block 212 in order to determine which window regions from the enrolled fingerprint images have sufficiently similar minutiae scores to warrant classifying them as belonging to enrolled fingerprint images that may be strong candidates for later unconstrained matching, which may then occur in block 214. Such a comparison may be an exact comparison, e.g., only window regions from the inquiry fingerprint images having a minutiae score that matches exactly with the minutiae score of a window region from the enrolled fingerprint image may be deemed as being indicative of a good match, or may be less strict, e.g., window regions in which the minutiae scores are within a certain tolerance of one another may be deemed as being indicative of a good match. In implementations with multi-dimensional or multi-component minutiae scores, the components for each window region may be compared separately against the corresponding components in the other window region, and each component may have its own tolerance band within which it may be deemed as corresponding sufficiently with the component in the other minutiae score and thus indicative of a potential match. In some implementations, these tolerance bands used in comparing a window region from the inquiry fingerprint and a window region from an enrolled fingerprint may be increased for that comparison if one or both of the inquiry fingerprint window region and the enrolled fingerprint window region are only partially overlapped with the respective fingerprint image. For example, if only 90% of the window region from an enrolled fingerprint image overlaps with the enrolled fingerprint image, then the tolerance for comparing that window region to the window region for the inquiry fingerprint image may be increased beyond the tolerance that would be used if both window regions were completely overlapped by their respective fingerprint images, e.g., increased by 10%, for example.

Figure 8:
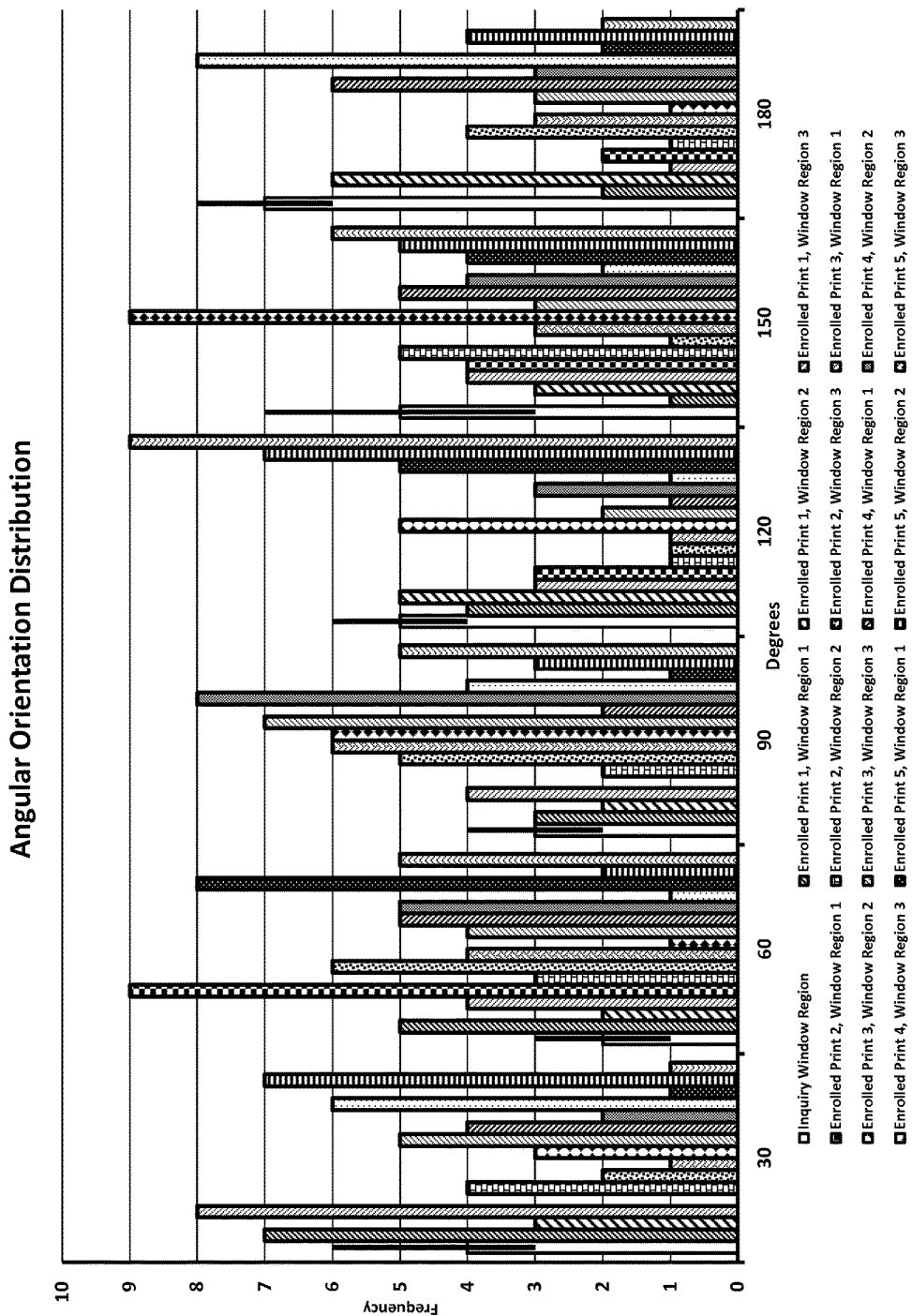
FIG. 8 depicts a histogram of a multi-component minutiae score for an example window region of an example inquiry fingerprint and corresponding components of minutiae scores for example window regions drawn from five example enrolled fingerprints.
Figure 9:
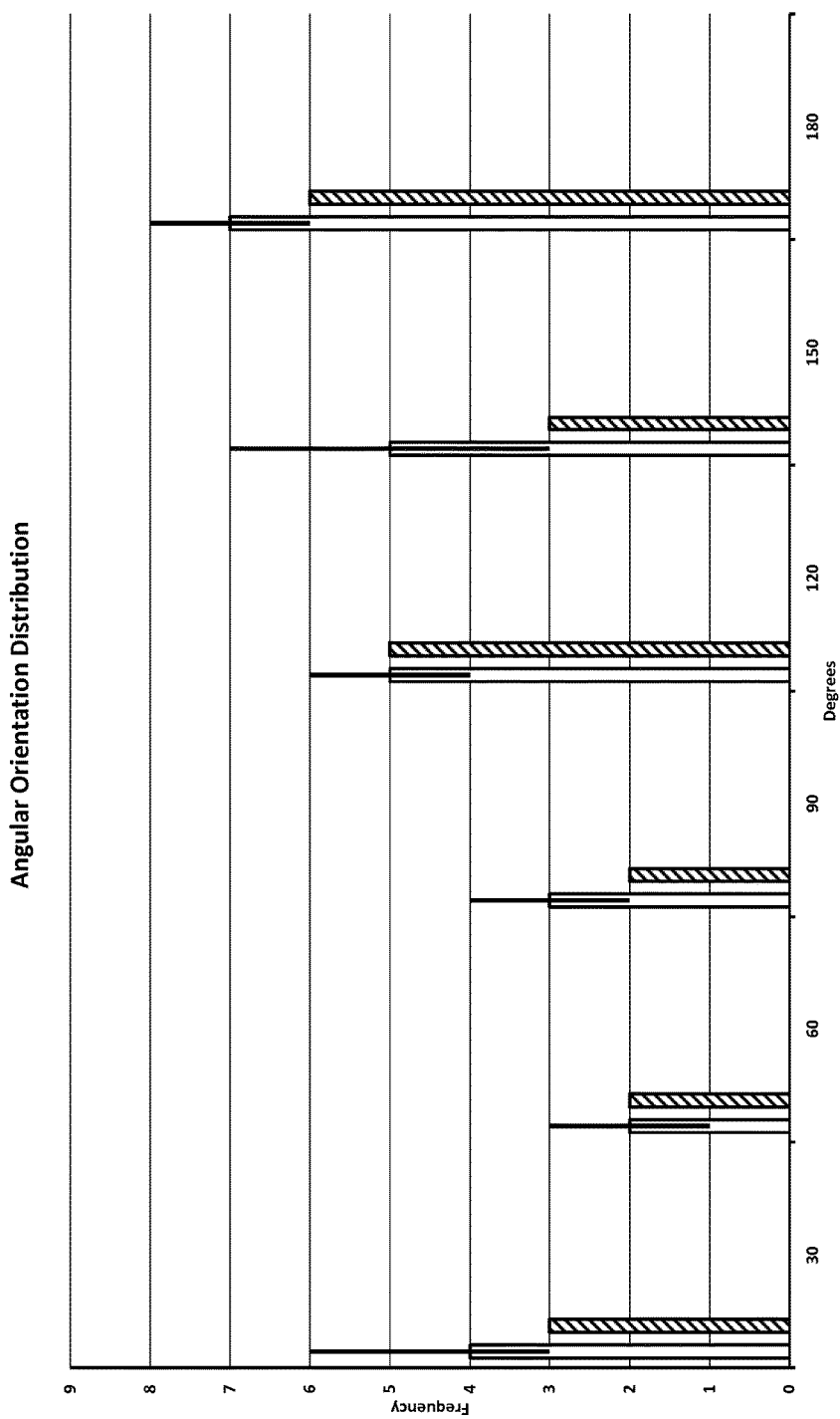
FIG. 9 depicts the same data as in FIG. 8, but with only the data for the enrolled fingerprint window region with the minutiae score that sufficiently matches the minutiae score of the inquiry fingerprint image shown.

FIG. 8 depicts a histogram of a multi-component minutiae score for an example window region of an example inquiry fingerprint and corresponding components of minutiae scores for example window regions drawn from five example enrolled fingerprints. In FIG. 9, a six-component minutiae score (in this example, based on the angular orientation distribution of minutiae within each window region) for a window region of an inquiry fingerprint is shown (solid white bars), along with "tolerance" bars for each component. In this example, the tolerance bars are not necessarily equal in the positive and negative directions, nor are they necessarily equal from component to component, although in other implementations, the tolerance bars from component to component may be equal and/or may be equal in both directions for an individual component. Also shown in FIG. 8 are corresponding minutiae score components for three window regions from each of three different enrolled fingerprints; each of the window regions from enrolled fingerprints shown is part of the set of window regions discussed earlier. As can be seen, the minutiae score components for each window region exhibit a large degree of variation from window region to window region. The minutiae score components of each window region in the enrolled fingerprints may be compared against the corresponding minutiae score components of the inquiry fingerprint window region, and the window regions of the enrolled fingerprint images with minutiae score components that are sufficiently similar to the minutiae score components of the window region of the inquiry fingerprint image may be identified and deemed potential candidates for unconstrained matching. In this example, there is only one window region of the 15 window regions of the enrolled fingerprint images shown in which all six of the components of the minutiae score for the enrolled fingerprint image window region are within the tolerance bands established for the inquiry fingerprint image window region. FIG. 9 depicts the same data as in FIG. 8, but with only the data for the enrolled fingerprint window region with the minutiae score that sufficiently matches the minutiae score of the inquiry fingerprint image shown. As can be seen, the only enrolled fingerprint image in this example that has a window region that has a strong correlation to the window region of the inquiry fingerprint image is the second window region of the first enrolled fingerprint image. Accordingly, the second and third enrolled fingerprint images may be deemed to be poor potential match candidates, and may be removed from the set of potential candidate fingerprint images in the enrolled fingerprint images for which unconstrained matching may be performed. In this example, this process has resulted in a 66% reduction of the enrolled fingerprint images for which unconstrained matching may be performed.

It is to be understood that while this example only considered one window region from one inquiry fingerprint, and three window regions from each of five different enrolled fingerprint images, in actual practice, there may tens or hundreds of window regions for the inquiry fingerprint image, as well as tens or hundreds of window regions for each of the enrolled fingerprint images. Moreover, the number of enrolled fingerprint images may number in the tens, hundreds, thousands, tens of thousands, hundreds of thousands, or even higher.

Figure 10:
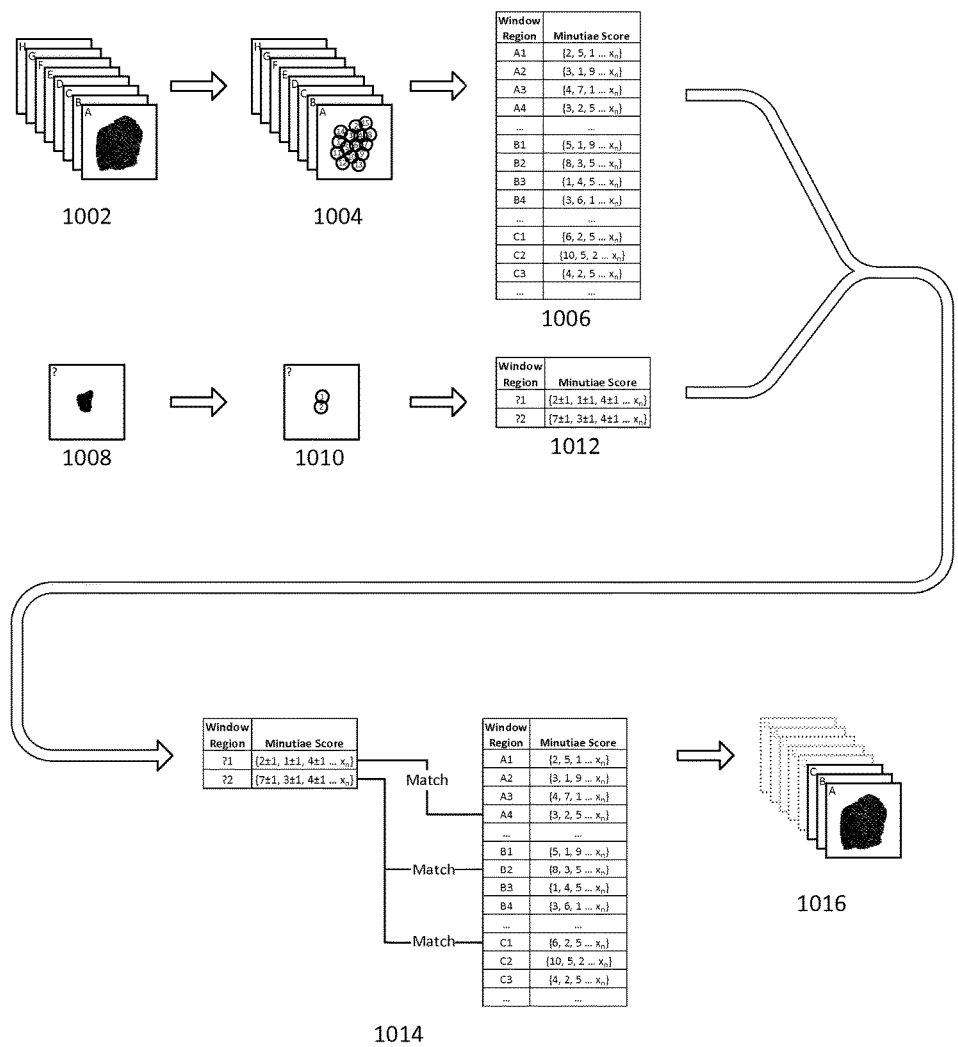
FIG. 10 depicts a flow schematic of the technique outlined in FIG. 2.

FIG. 10 depicts a flow schematic of the technique outlined in FIG. 2. As can be seen, a database of enrolled fingerprint images A-H is provided in 1002. This database of enrolled fingerprint images is then analyzed to identify the locations of window regions within each fingerprint image in 1004. Each window region is then analyzed to determine a minutiae score in 1006.

In a parallel process, an inquiry fingerprint image may be obtained in 1008; the inquiry fingerprint image is analyzed in 1010 and one or more window regions may be identified for the inquiry image. The window regions for the inquiry image are then analyzed and minutiae scores for those window regions are determined in 1012. Once the window regions for both the enrolled fingerprint images and the inquiry fingerprint images have been analyzed and minutiae scores for each determined, the flow may then proceed to 1014, in which the minutiae scores of the window regions for the inquiry fingerprint image are compared against the minutiae scores of the window regions for the enrolled fingerprint images, as outlined above. In this example, the fourth window region from enrolled fingerprint image A has a minutiae score that matches to a sufficient extent with the minutiae score of the first window region of the inquiry fingerprint image, and the second window region of enrolled fingerprint image B and the first window region of enrolled fingerprint image C match to a sufficient extent with the minutiae score of the second window region of the inquiry fingerprint image. While not shown, none of the minutiae scores of the window regions of enrolled fingerprint images D-H match to a sufficient extent with the minutiae scores of the window regions of the inquiry fingerprint image. As a result, in 1016, the only fingerprint images that have been selected for future unconstrained matching are enrolled fingerprint images A, B, and C.

It is to be understood that in some implementations with multi-dimensional or multi-component minutiae scores, some components may not be compared against their corresponding components in the other window region if one or both components are suspect, such as if a window region is applied to a fingerprint such that the entire window region does not overlap with the fingerprint. In such a case, the accuracy of certain types of minutiae score with respect to that window region may be more adversely affected than other types of minutiae score. For example, a minutiae score component that is based on counting the number of ridges across the window region may be more severely affected than a minutiae score component that is based on the total number of minutiae within that window region when the window region is only partially overlapping with a fingerprint. In such circumstances, the component based on the minutiae count may still be a useful basis for comparison against the corresponding component of the other window region, but the component based on the ridge count may not be a useful basis for comparison due to the partial overlap of the window region with the fingerprint—in fact, using such a component as a basis for comparison may result in the accidental elimination of a good potential match candidate if the window region were to be fully overlapped by the fingerprint.

It is to be understood that the above constrained matching technique is quite flexible, and that there are many parameters that may be adjusted, including, for example, the size, shape, and locations of the window regions, the minutiae types that are identified and used to generate the minutiae score, the nature of the minutiae score, the number of components of the minutiae score, etc. All of these parameters may be adjusted in order to increase or decrease the sensitivity of the technique so as to decrease or increase the number of "candidate" enrolled fingerprint images that may then be subjected to unconstrained matching in a subsequent stage. It is to be further understood that the above technique may be performed multiple times using different parameters for an inquiry image and an enrolled fingerprint image database, and that the "candidate" enrolled fingerprint images resulting from each such implementation of the technique may then be clustered together as a group or otherwise used to refine the set of candidate enrolled fingerprint images, e.g., the technique may be repeated multiple times using different parameters, and only the enrolled fingerprint images identified as potential candidate enrolled fingerprint images in all or more than one of these repeated applications of the technique may then be subjected to unconstrained matching.

It is also to be understood that parameters of each window region, the minutiae characteristics for each window region, and/or the minutiae score and parameters relating thereto may be stored in a database for future reference. This avoids the need to recalculate such parameters for each enrolled fingerprint image for each analysis if a later inquiry fingerprint analysis involves similar such parameters. This information may be stored in a database as textual and/or numeric data, which allows for rapid filtering and comparison against similar information derived for a particular inquiry fingerprint.

The above techniques may be implemented in a computerized environment, e.g., a computer, server, or distributed computing system such as a cloud-based computing system. In such an implementation, computer-executable instructions for controlling a processor or processor of such an apparatus or system to perform aspects of the above-described technique may be stored on a memory or memories of the apparatus or system.

Figure 11:
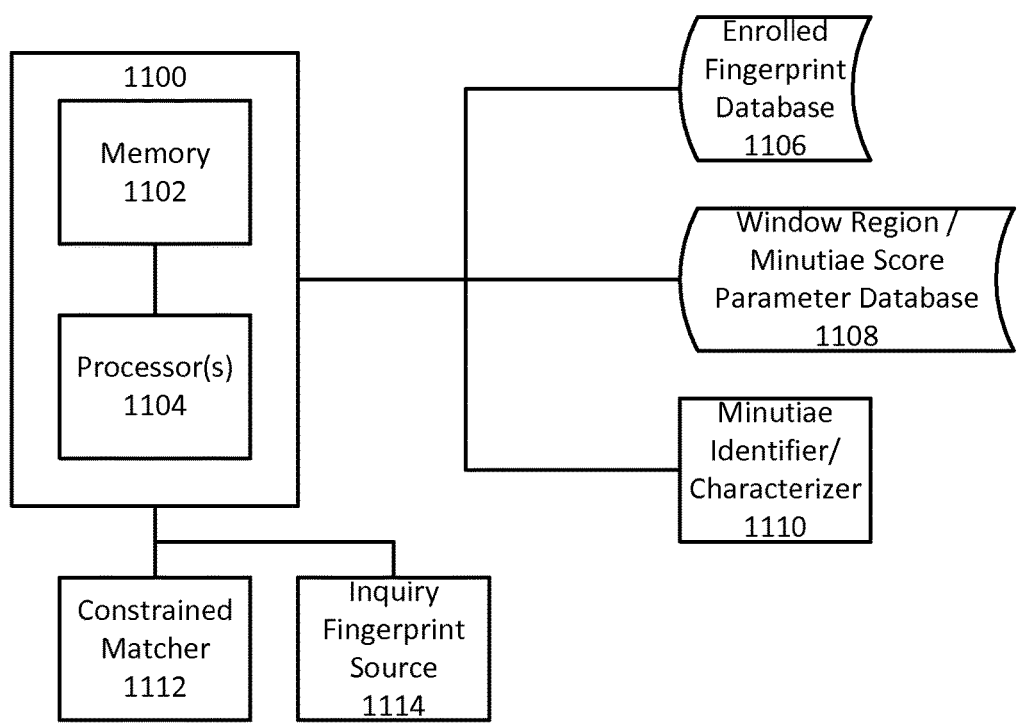
FIG. 11 depicts a simplified diagram of a computing system that may be used to implement the techniques described herein.

FIG. 11 depicts a simplified diagram of a computing system that may be used to implement the above-discussed technique. In FIG. 11, a computing apparatus 1100 having one or more processors 1104 and one or more memories 1102 is shown; the memory or memories 1102 may, as discussed above, store executable instructions for controlling the one or more processors 1104 to perform the constrained matching technique discussed above. The computing apparatus 1100 may be communicatively connected with an enrolled fingerprint database 1106, which may be one database or a virtual database drawn from multiple discreet data sources. The computing apparatus 1100 may access the enrolled fingerprint images in the enrolled fingerprint database 1106 in order to perform constrained matching, as discussed above. Additionally, the computing apparatus 1100 may be communicatively connected with an inquiry fingerprint source 1114, e.g., a fingerprint scanner or data storage device from which an inquiry fingerprint may be obtained.

The computing apparatus 1100 may also be communicatively connected with a window region/minutiae characteristic/minutiae score database 1108, which may store data relating to window regions, minutiae characteristics, and/or minutiae scores for the enrolled fingerprint images in the enrolled fingerprint database; the window region/minutiae characteristic/minutiae score database 1108 may be used as a repository for storing the information relating to window regions of the enrolled fingerprint images for later retrieval and use in constrained matching operations. The computing apparatus 1100 may also be communicatively connected with a minutiae identifier or characterizer 1110, which may be used to identify and characterize minutiae within each fingerprint image; these characteristics may then be provided to the computing apparatus 1100, which may determine the size, shape, and placement of window regions in the enrolled fingerprint images and determine the minutiae score for each such window region. After determining which enrolled fingerprint images are potential candidates for unconstrained matching, the computing apparatus 1100 may cause the unconstrained matcher 1112 to perform unconstrained matching between the inquiry fingerprint image and the candidate enrolled fingerprint images.

It is to be understood that the techniques discussed herein may also be practiced in computing systems having different architectures from that depicted in FIG. 11 but that nonetheless provide the unconstrained matching functionality discussed herein; this disclosure is to be understood as encompassing these other computing systems as well. In some implementations, the constrained filtering functionality discussed herein may be provided by a computing system that may then forward the enrolled fingerprint images that are identified as potential constrained matching candidates to some other computing system (or systems) that handle constrained matching.

It is to be further understood that the techniques discussed herein are, in a practical sense, truly only useful if implemented in a computerized system, as fingerprint identification generally requires either matching an inquiry fingerprint against thousands or millions of fingerprints, as is the case in forensics fingerprint matching, or requires that a fingerprint be matched within a very short period of time, such as is the case in biometric authentication contexts. In either situation, only a computerized implementation of the above-disclosed technique will be able to process the vast quantities of data involved in a realistic timeframe—manual performance of the technique without computer-based assistance is simply not feasible.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method comprising:
   (a) determining, for each enrolled fingerprint of a plurality of enrolled fingerprints stored in a fingerprint database, locations for one or more window regions within that enrolled fingerprint;
   (b) determining, for each window region of each enrolled fingerprint, a minutiae score that is a function of one or more characteristics exhibited by minutiae contained within that window region and that reflects demographic characteristics of the minutiae within that window region;

(c) determining, for an inquiry fingerprint, locations for one or more window regions within the inquiry fingerprint;

(d) determining, for each window region of the inquiry fingerprint, the minutiae score based on the characteristics exhibited by the minutiae contained within that window region, wherein the minutiae score reflects demographic characteristics of the minutiae within that window region;

(e) comparing at least one component of at least one of the one or more minutiae scores determined for the one or more window regions of the inquiry fingerprint against at least one corresponding component of the minutiae scores determined for a set of the one or more window regions of the enrolled fingerprints;

(f) determining that a set of the enrolled fingerprints with window regions in the set of window regions have at least one window region that is associated with a minutiae score that has at least one component that is within a predetermined range of at least one corresponding component of the minutiae score of at least one of the window regions of the inquiry fingerprint; and (g) performing unconstrained matching between the inquiry fingerprint and the enrolled fingerprints in the set of enrolled fingerprints, wherein the window regions for the enrolled fingerprints and the inquiry fingerprint are all substantially the same size and shape.

2. The method of claim 1, further comprising, prior to performing (e):

determining that the minutiae score for one or more of the one or more window regions of the enrolled fingerprints does not meet a threshold requirement; and populating the set of window regions with the window regions of the enrolled fingerprints that have a minutiae score that meets the threshold requirement.

3. The method of claim 1, wherein the window regions are each substantially circular.

4. The method of claim 1, wherein the window regions are each substantially rectangular.

5. The method of claim 1, wherein the minutiae score is a function of one or more characteristics selected from the group consisting of: type or types of minutiae within the window region, number of minutiae within the window region, number of each type of minutiae within the window region, angular distribution between minutiae within the window region, distance distribution between minutiae within the window region, ridge density within the window region, ridge count within the window region, and type of minutia closest to center of the window region.

6. The method of claim 1, wherein, for each enrolled fingerprint and inquiry fingerprint, the window regions for that enrolled fingerprint or inquiry fingerprint are each centered on a different minutia of that enrolled fingerprint or inquiry fingerprint.

7. A non-transitory, tangible machine-readable storage medium storing machine-readable instructions for controlling one or more processors to:

(a) determine, for each enrolled fingerprint of a plurality of enrolled fingerprints stored in a fingerprint database, locations for one or more window regions within that enrolled fingerprint;

(b) determine, for each window region of each enrolled fingerprint, a minutiae score that is a function of one or more characteristics exhibited by minutiae contained within that window region and that reflects demographic characteristics of the minutiae within that window region;

(c) determine, for an inquiry fingerprint, locations for one or more window regions within the inquiry fingerprint;

(d) determine, for each window region of the inquiry fingerprint, the minutiae score based on the characteristics exhibited by the minutiae contained within that window region, wherein the minutiae score reflects demographic characteristics of the minutiae within that window region;

(e) compare at least one component of at least one of the one or more minutiae scores determined for the one or more window regions of the inquiry fingerprint against at least one corresponding component of the minutiae scores determined for a set of the one or more window regions of the enrolled fingerprints;

(f) determine that a set of the enrolled fingerprints with window regions in the set of window regions have at least one window region that is associated with a minutiae score that has at least one component that is within a predetermined range of at least one corresponding component of the minutiae score of at least one of the window regions of the inquiry fingerprint; and (g) perform unconstrained matching between the inquiry fingerprint and the enrolled fingerprints in the set of enrolled fingerprints, wherein the window regions for the enrolled fingerprints and the inquiry fingerprint are all substantially the same size and shape.

8. The non-transitory, tangible machine-readable storage medium of claim 7, the non-transitory, tangible machine-readable storage medium further storing machine-readable instructions for controlling the one or more processors to, prior to performing (e):

determine that the minutiae score for one or more of the one or more window regions of the enrolled fingerprints does not meet a threshold requirement; and populate the set of window regions with the window regions of the enrolled fingerprints that have a minutiae score that meets the threshold requirement.

9. The non-transitory, tangible machine-readable storage medium of claim 7, the non-transitory, tangible machine-readable storage medium further storing machine-readable instructions for controlling the one or more processors to cause the window regions to be substantially circular.

10. The non-transitory, tangible machine-readable storage medium of claim 7, the non-transitory, tangible machine-readable storage medium further storing machine-readable instructions for controlling the one or more processors to cause the window regions to be substantially rectangular.

11. The non-transitory, tangible machine-readable storage medium of claim 7, the non-transitory, tangible machine-readable storage medium further storing machine-readable instructions for controlling the one or more processors to determine the minutiae score as a function of one or more characteristics selected from the group consisting of: type or types of minutiae within the window region, number of minutiae within the window region, number of each type of minutiae within the window region, angular distribution between minutiae within the window region, distance distribution between minutiae within the window region, ridge density within the window region, ridge count within the window region, and type of minutia closest to center of the window region.

12. The non-transitory, tangible machine-readable storage medium of claim 7, the non-transitory, tangible machine-readable storage medium further storing machine-readable instructions for controlling the one or more processors to cause the window regions for each enrolled fingerprint or inquiry fingerprint to each be centered on a different minutia of that enrolled fingerprint or inquiry fingerprint.

13. A system comprising:
   a memory;
   one or more processors;
   an enrolled fingerprint database; and
   an inquiry fingerprint source; wherein:
   the memory and the one or more processors are communicatively connected with one another and with the enrolled fingerprint database and the inquiry fingerprint source, and
   the memory stores machine-readable instructions for controlling the one or more processors to:
   (a) determine, for each enrolled fingerprint of a plurality of enrolled fingerprints stored in the fingerprint database, locations for one or more window regions within that enrolled fingerprint,
   (b) determine, for each window region of each enrolled fingerprint, a minutiae score that is a function of one or more characteristics exhibited by minutiae contained within that window region and that reflects demographic characteristics of the minutiae within that window region,
   (c) determine, for an inquiry fingerprint obtained from the inquiry fingerprint source, locations for one or more window regions within the inquiry fingerprint,
   (d) determine, for each window region of the inquiry fingerprint, the minutiae score based on the characteristics exhibited by the minutiae contained within that window region, wherein the minutiae score reflects demographic characteristics of the minutiae within that window region,
   (e) compare at least one component of at least one of the one or more minutiae scores determined for the one or more window regions of the inquiry fingerprint against at least one corresponding component of the minutiae scores determined for a set of the one or more window regions of the enrolled fingerprints,
   (f) determine that a set of the enrolled fingerprints with window regions in the set of window regions have at least one window region that is associated with a minutiae score that has at least one component that is within a predetermined range of at least one corresponding component of the minutiae score of at least one of the window regions of the inquiry fingerprint, and
   (g) perform unconstrained matching between the inquiry fingerprint and the enrolled fingerprints in the set of enrolled fingerprints, wherein the window regions for the enrolled fingerprints and the inquiry fingerprint are all substantially the same size and shape.

14. The system of claim 13, wherein the memory further stores machine-readable instructions for controlling the one or more processors to, prior to performing (e):
   determine that the minutiae score for one or more of the one or more window regions of the enrolled fingerprints does not meet a threshold requirement, and
   populate the set of window regions with the window regions of the enrolled fingerprints that have a minutiae score that meets the threshold requirement.

15. The system of claim 13, wherein the memory further stores machine-readable instructions for controlling the one or more processors to cause the window regions to be substantially circular.

16. The system of claim 13, wherein the memory further stores machine-readable instructions for controlling the one or more processors to cause the window regions to be substantially rectangular.

17. The system of claim 13, wherein the memory further stores machine-readable instructions for controlling the one or more processors to determine the minutiae score as a function of one or more characteristics selected from the group consisting of: type or types of minutiae within the window region, number of minutiae within the window region, number of each type of minutiae within the window region, angular distribution between minutiae within the window region, distance distribution between minutiae within the window region, ridge density within the window region, ridge count within the window region, and type of minutia closest to center of the window region.

18. The system of claim 13, wherein the memory further stores machine-readable instructions for controlling the one or more processors to cause the window regions for each enrolled fingerprint or inquiry fingerprint to each be centered on a different minutia of that enrolled fingerprint or inquiry fingerprint.

19. A system comprising:
   means for determining, for each enrolled fingerprint of a plurality of enrolled fingerprints stored in a fingerprint database, locations for one or more window regions within that enrolled fingerprint;
   means for determining, for each window region of each enrolled fingerprint, a minutiae score that is a function of one or more characteristics exhibited by minutiae contained within that window region and that reflects demographic characteristics of the minutiae within that window region;
   means for determining, for an inquiry fingerprint obtained from an inquiry fingerprint source, locations for one or more window regions within the inquiry fingerprint, wherein the window regions for the enrolled fingerprints and the inquiry fingerprint are all substantially the same size and shape;
   means for determining, for each window region of the inquiry fingerprint, the minutiae score based on the characteristics exhibited by the minutiae contained within that window region and reflecting demographic characteristics of the minutiae within that window region;
   means for comparing at least one component of at least one of the one or more minutiae scores determined for the one or more window regions of the inquiry fingerprint against at least one corresponding component of the minutiae scores determined for a set of the one or more window regions of the enrolled fingerprints;
   means for determining that a set of the enrolled fingerprints with window regions in the set of window regions have at least one window region that is associated with a minutiae score that has at least one component that is within a predetermined range of at least one corresponding component of the minutiae score of at least one of the window regions of the inquiry fingerprint; and
   means for performing unconstrained matching between the inquiry fingerprint and the enrolled fingerprints in the set of enrolled fingerprints.

20. The system of claim 19, the system further comprising means for, prior to performing (e), determining that the minutiae score for one or more of the one or more window regions of the enrolled fingerprints does not meet a threshold requirement and populating the set of window regions with the window regions of the enrolled fingerprints that have a minutiae score that meets the threshold requirement.

\* \* \* \* \*